United States Patent
Florent et al.

(10) Patent No.: US 6,256,403 B1
(45) Date of Patent: Jul. 3, 2001

(54) METHOD OF PROCESSING AN IMAGE IN WHICH THE NOISE IS SIGNAL-DEPENDENT

(75) Inventors: Raoul Florent, Valenton; Shérif Makram-Ebeid, Dampierre; Christel Soyer, deceased, late of Paris, all of (FR), by François R. G. Charpail, legal representative

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/207,733

(22) Filed: Dec. 8, 1998

(30) Foreign Application Priority Data

Dec. 9, 1997 (FR) .................................................. 97 15566

(51) Int. Cl.$^7$ ...................................................... G06K 9/00
(52) U.S. Cl. ........................................... 382/128; 382/132
(58) Field of Search ..................... 382/128, 260, 382/274, 130, 131, 132, 168; 600/431, 328, 443

(56) References Cited

U.S. PATENT DOCUMENTS

| | | | |
|---|---|---|---|
| 5,649,021 | * | 7/1997 | Matey et al. .......................... 382/128 |
| 5,673,332 | * | 9/1997 | Nishikawa et al. ................... 382/128 |
| 5,909,515 | * | 6/1999 | Makram ................................ 382/260 |
| 5,911,012 | * | 6/1999 | Bernard et al. ....................... 382/260 |

OTHER PUBLICATIONS

"An adaptive technique for digital noise suppression in on-line port imaging" by Konad W. Leszcynski, published in Phys. Med Biol. 1990, vol. 35, No. 3, 429–439.

* cited by examiner

Primary Examiner—Matthew C. Bella
Assistant Examiner—M B Choobin
(74) Attorney, Agent, or Firm—John F. Vodopia

(57) ABSTRACT

The invention relates to an image processing method for determining a noise curve (NC) relating to an image, including acquisition (100) of an intensity image ($J_o$) of pixels in which the noise is dependent on the signal, cutting (101) the intensity levels into substantially uniform (Mk) bands (QMk), determination (111) of statistical rules (f) which link distributions (Hk) of the standard noise deviations at the levels (QSk) to the intensities of said bands (QMk), determination (114), on the basis of statistical rules (f), of standard noise deviations (SBk) as a function of intensities (Mk), and determination (120) of the noise curve (NC) as a statistical rule (g) of the variations of the standard noise deviations (SBk) as a function of the intensity (Mk).

The invention also relates to a method of reducing the noise which utilizes the standard noise deviation (SBk) and to a medical imaging apparatus which utilizes the noise reduction method.

12 Claims, 3 Drawing Sheets

METHOD OF PROCESSING AN IMAGE IN WHICH THE NOISE IS SIGNAL-DEPENDENT

BACKGROUND OF THE INVENTION

1. Field of the Invention

The invention relates to an image processing method for determining a noise curve relating to an image, which method includes the acquisition of an image formed by pixels having an intensity which includes a signal component and a noise component which is dependent on the signal. The invention also relates to an image processing method for reducing the noise of an image, and to a medical imaging apparatus provided with a system for carrying out such a method.

The invention is intended for use in particular in a medical X-ray imaging system. The noise in X-ray images is dependent on the signal. This means that the noise level in the dark zones and in the bright zones of the image is not identical. The noise can be defined on the one hand by a value which is called the standard noise deviation relative to the mean noise. This standard noise deviation on the other hand can be represented as a function of the signal by a so-called noise curve. Noise is linked to a probability density concerning the intensity levels. In the case of video the probability density is that of Gaussian noise, being an electronic noise which is independent of the signal. The noise curve representative of the standard noise deviation as a function of the signal is then a constant. In the case of X-rays the probability density is that of a Poisson noise distribution which stems from quantum noise and this quantum noise is dependent on the signal. The noise curve representative of the standard noise deviation as a function of the signal is normally linear and ascending in the case of a Poisson noise distribution. A problem encountered is that X-ray systems include electronic devices which modify the shape of these noise curves. In the case of Poisson noise distribution the noise curve is generally not linear and not constantly ascending. It is not that of a true Poisson noise distribution, because the noise is passed through the entire electronic chain. Therefore, this noise curve must be determined in each case.

2. Description of Related Art

An image processing method which determines, in the course of processing, the variance of the noise in a sequence of digital images in which the noise is dependent on the signal is already known from the article "An adaptive technique for digital noise suppression in on-line portal imaging" by Konad W Leszcynski, published in Phys. Med. Biol., 1990, Vol. 35, No 3,429–439, printed in the UK. The cited document describes a noise reduction method which takes into account the variance of the noise. To this end, the variance of the intensity of the pixels is measured on-line in a uniform region in an averaged image during the processing of the images. This averaged image is the average of N individual video images. The variance is represented as a function of 1/N. The variance of the noise is reduced by said factor N in the averaged image. Thus, the variance of the random noise is estimated by way of the slope of the local variance.

SUMMARY OF THE INVENTION

In a first example of an application, relating to X-ray imaging, it is very important to reduce the noise because the signal applied to the patient is generally very weak since these images are generally very noisy. In order to achieve the reduction of the noise in an image it is necessary to evaluate the noise and hence to determine the standard noise deviation curve as a function of the signal for the reasons described above. In another example of an application, relating to video, it may also be necessary to reduce the noise before encoding because this noise contains high frequencies and the encoding of high frequencies is very costly.

SUMMARY OF THE INVENTION

The present invention offers a solution to this problem by providing an image processing method as defined in claim 1.

The method according to the invention offers the advantage that it can be used for estimating quantum noise as well as for estimating electronic noise, i.e. for estimating noise with a Poisson distribution as well as for estimating noise with a Gaussian distribution. Another advantage resides in the fact that the method is suitable for real-time execution.

An image processing method for reducing the noise in an image involves the execution of such a method as defined in claim 9.

A medical imaging apparatus provided with means for reducing the noise in a noisy digital medical image includes means as defined in claim 10.

BRIEF DESCRIPTION OF THE DRAWINGS

The invention will be described in detail hereinafter with reference to the accompanying diagrammatic drawings; therein.

DESCRIPTION OF THE PREFERRED EMBODIMENTS

The principle of the method according to the invention is based on the property of additivity of the variance of the noise or more specifically on a property of growth of the standard deviation. In as far as the standard noise deviation is concerned, it can be written that the standard deviation of noise plus the signal, referred to as S(B+Sg) is always greater than the standard deviation of noise alone, referred to as S(B), in conformity with the following formula:

$$S(B+Sg) > SB \quad (1)$$

This formula signifies that even though the noise is dependent on the signal, it is distinct from the signal. This statement will be confirmed by another relation. The variance of the noise plus the signal is equal to the variance of the noise increased by the variance of the signal, which can be written as:

$$\text{variance }(B+Sg) = \text{variance }(B) + \text{variance }(Sg) \quad (2)$$

$$\text{where variance }(B) = [S(B)]^2 \quad (3)$$

Figure 2:
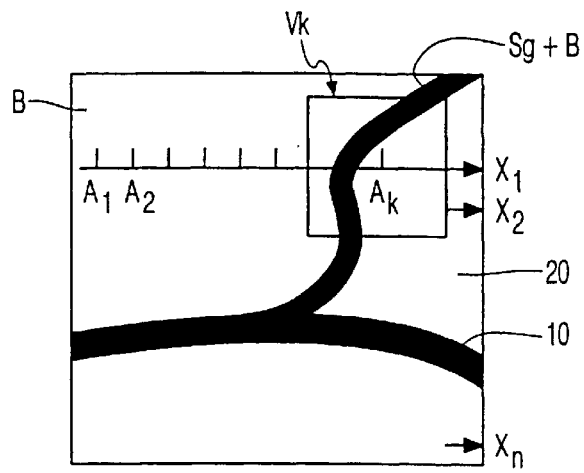
FIG. 2 shows an initial image $J_o$.

Referring to FIG. 2, in an initial image $J_o$, such as an X-ray image, the signal Sg is formed notably by the object edges 10. The background shows essentially the noise B. Those skilled in the art will generally know that it is necessary to separate the signal from the noise before estimating the noise and that the edges can be extracted for this purpose. This type of known method includes: the detection of the edges, followed by the extraction of the edges. Such a known method has numerous drawbacks. Actually, it is difficult to estimate the edges correctly and to detect these edges in a reliable manner. Consequently, it is difficult to extract these edges because either too much information or not enough information is extracted. Moreover, the suppression of the edges modifies the probability density of the noise. Consequently, at the completion of the extraction of the edges, the estimation of the noise is biased by this action. According to the invention, instead of separating the signal Sg and the noise B in an explicit manner, the signal and the noise are separated in a statistical manner.

Figure 1:
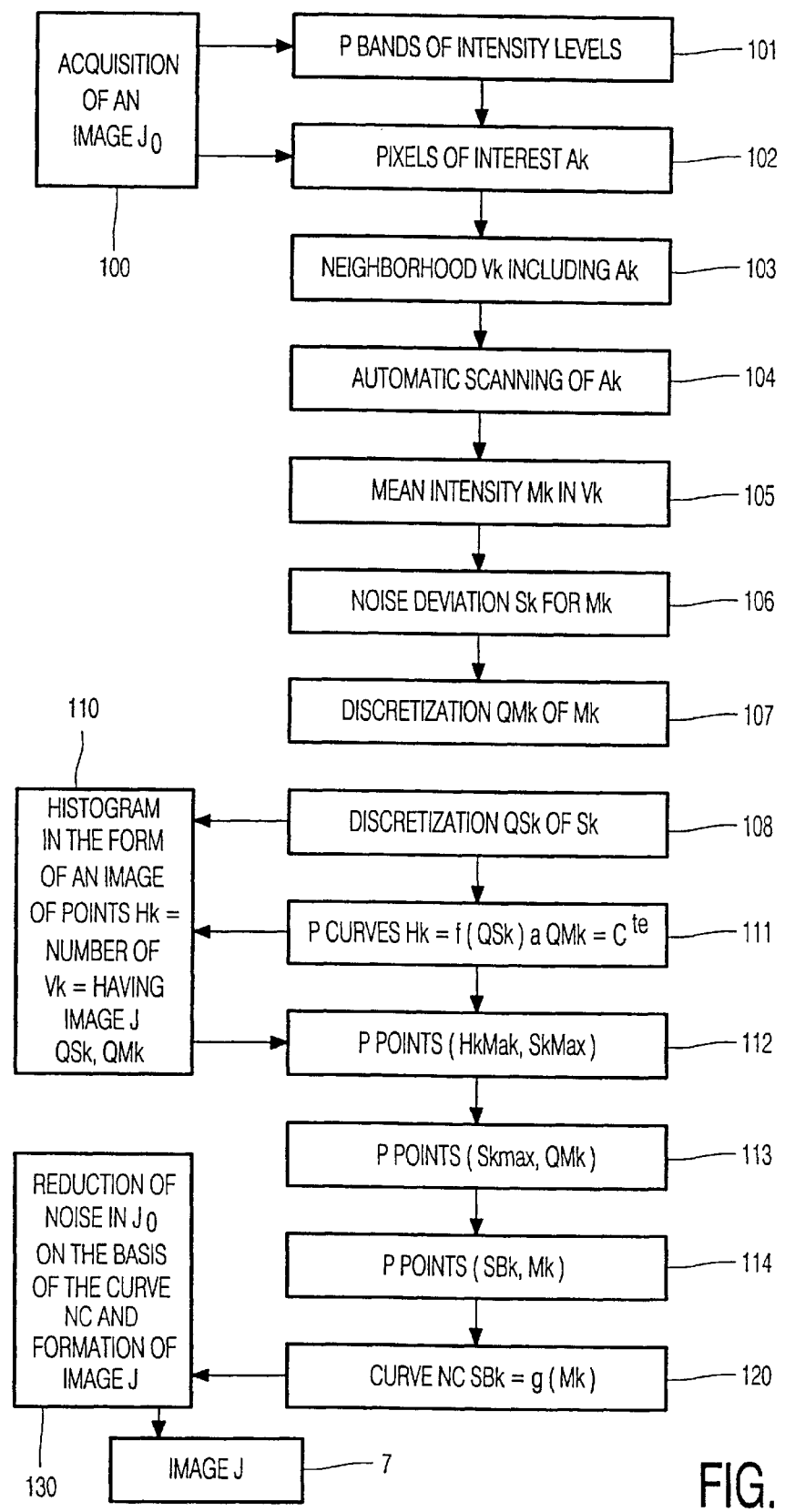
FIG. 1 shows a diagram of the steps of a method for determining the noise curve and for reducing the noise.

Referring to FIG. 1, showing the steps of the method in the form of a diagram, the method includes:

1) The acquisition (100) of an image $J_0$ which is formed by pixels Ak, each of which has an address k which belongs to a set [1,K] and an intensity which includes a signal component Sg and a noise component B which is dependent on the signal.

2) The cutting (101) of the intensity levels of the image into bands. The steps of the present method aim to separate the noise from the signal in a statistical manner on the basis of the fact that in the image zones in which there is a signal, for example the zone 10 of FIG. 2, there is also noise whose standard deviation of the signal plus the noise is always greater than the standard deviation relating to the zones in which there is no noise, for example the zones 20 of FIG. 2. The principle of the invention is also based on the fact that the noise B is dependent on the signal Sg. Since the noise is dependent on the mean local intensity level in this step, the set of intensity levels of the image is cut into a number of P bands of intensity levels which are numbered from 1 to P, each band comprising substantially constant intensity levels. For each band there exists a standard noise deviation, referred to as Sk, with respect to the mean value, referred to as Mk, of the intensity levels in the band. Consequently, in each of the P bands of intensity levels there are different possible standard noise deviations Sk with a maximum corresponding to a concomitant presence of the signal Sg and the noise B.

3) The determination (102) of the pixels of interest in the image which are referred to as Ak. The image $J_0$ as shown in FIG. 2 may contain all the original pixels or may be sub-sampled.

4) The determination (103) of a neighborhood Vk which contains a number of pixels enclosing each pixel of interest Ak and also contains said pixel of interest Ak. For the simplicity of the calculations the neighborhood Vk generally has a square or rectangular shape as shown in FIG. 2. Circles or disc shapes lead to more complex calculations.

5) The scanning (104) of the image according to the pixels of interest Pk provided with their neighborhood Vk. Preferably, the image is scanned according to a standard scanning system which is known to a person skilled in the art, for example from left to right and from the top downwards along parallel lines X1, X2, Xn as shown in FIG. 2. Each pixel being processed is called a current pixel Ak.

6. The determination (105) of a mean local intensity Mk in the neighborhood Vk. The mean local intensity Mk determined is assigned to the current pixel Ak. The mean local intensity can be determined in conformity with the formula:

$$Mk = \frac{1}{N} \sum_{j \in Vk} Ij \tag{4a}$$

in which I is the intensity of the pixels considered, j is the numbering of the pixels within the neighborhood Vk, and N is the number of pixels contained in the neighborhood Vk.

In order to simplify the calculations, the mean local intensity can be calculated in conformity with the formula:

$$Mk = Ck \tag{4b}$$

in which Ck is the intensity value of the central pixel, i.e. of the current pixel Ak within the neighborhood Vk.

7) The determination (106) of the standard noise deviation Sk corresponding to said mean intensity Mk. The standard noise deviation Sk can be calculated in conformity with the formula:

$$Sk = \sqrt{\frac{1}{N} \sum (Mk - Ij)^2} \tag{5a}$$

In this formula, the standard noise deviation Sk is calculated as the square root of the noise variance.

According to a simplified calculation method, the value of Sk can be calculated in conformity with the formula:

$$Sk = \frac{1}{N} \sum |(Ck - Ij)| \tag{5b}$$

The choice between the complete calculation of the values of Mk and Sk in conformity with the formules (4a) and (5a) and the simplified calculation of Mk and Sk in conformity with the formules (4b) and (5b) is not dynamic. This is a choice which is made at the start of the method and it does not change from one pixel to another. The two methods require different calculation capacities.

The method then includes:

8) The discretization (107, 108) of the mean local intensity values Mk and the corresponding standard deviations Sk, the discretized values being referred to as QMk and QSk, respectively.

To this end, the discretization (107) of the mean local intensity values Mk is performed by taking the integer part E(Mk) of the value found for Mk and by performing a complete division with a normalization coefficient which is referred to as $QM_{norm}$. Generally speaking, $QM_{norm}$ equals a power of 2. This can be written as:

$$QMk = E(Mk)/QM_{norm} \tag{6a}$$

The discretization (108) of the standard noise deviations Sk is performed on the other hand by taking the integer part $E(Sk.QS_{norm})$ of the value Sk found, multiplied by a normalization coefficient $QS_{norm}$; this is written as:

$$QSk = E[(Sk) \times QS_{norm}] \tag{6b}$$

Generally speaking, $QS_{norm} = 1$ or 2.

Any other discretization method known to those skilled in the art may be used for the same purpose.

Figure 3:
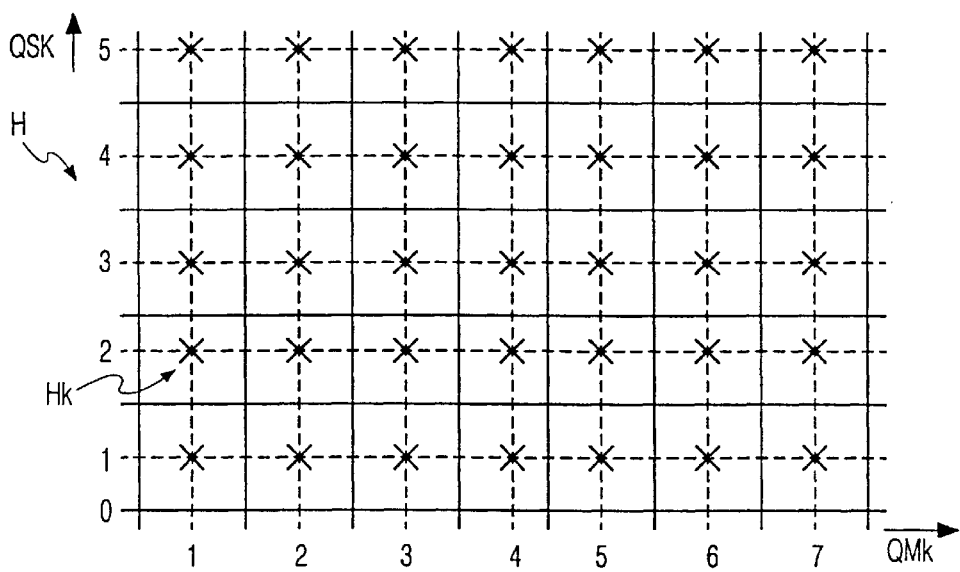
FIG. 3 shows a histogram H in the form of an image consisting of points Hk=(QSk, QMk)

9) The construction (110) of a histogram H as a two-dimensional image as shown in FIG. 3 in which the points are statistical parameters Hk whose co-ordinates are formed by the discretized local mean values QMk on the one hand and the discretized standard deviations QSk on the other hand; their third, variable dimensions in these co-ordinates, being comparable to the intensity of an image point, is the number Hk of pixels having a given discrete local mean value QMk and a corresponding discretized standard noise deviation QSk.

Figure 4:
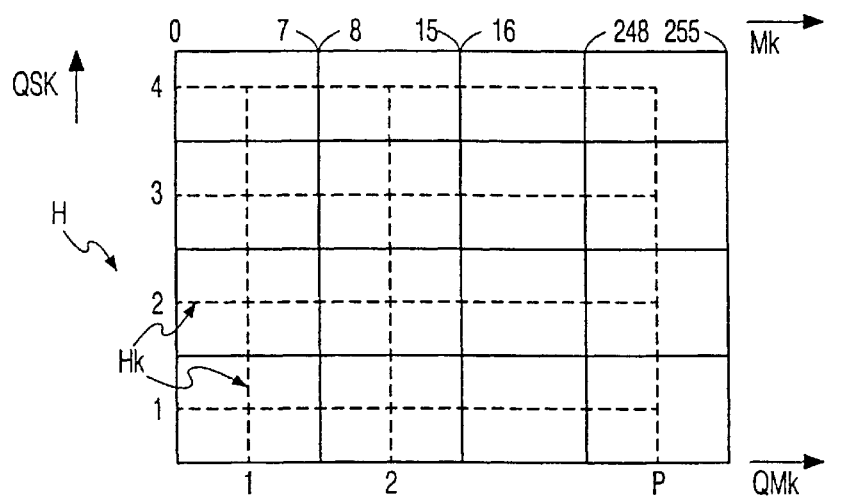
FIG. 4 illustrates the construction of the histogram H.

FIG. 4 illustrates an example of the construction of the histogram H. On the abscissa the grey levels or intensity levels of the image are plotted so as to determine the P bands of intensity levels whose number is dependent on the normalization coefficient $QM_{norm}$. If $QM_{norm}=8$, the vertical bands have a width of 8 intensity levels. The neighborhoods Vk of the image $J_0$ produce a mean local intensity Mk which lies in one of the bands M1 to MP. For each neighborhood Vk, having a discretized mean value QMk, a corresponding discretized standard deviation QSk is calculated on the other hand. The discretized standard deviations QSk are plotted on the ordinate. If $QS_{norm}=1$, boxes are determined in which the standard deviations are separated from 1 intensity level and which are superposed in each band 1 to P. Each discretized local mean value QMk and the corresponding discretized standard deviation QSk form a point (QMk, QSk) in a box of the histogram. During the scanning of the image $J_0$, the number Hk of the points in each box is incremented. The assembly constitutes a histogram in the form of an image of points in which the intensity of the points is the numbering Hk of points having the same co-ordinates (QMk, QSk). The normalization coefficients $QM_{norm}$ and $QS_{norm}$ are determined in such a manner that there is reasonable number P of bands in the histogram H and that there are reasonable values Hk in the boxes, i.e. that there are few empty boxes or boxes with a single element Hk equal to 1.

10) The determination (111), on the basis of the histogram H, of the statistical relations between the values of the statistical parameters Hk and the values of the discretized standard deviations QSk for each discretized local intensity value QMk. This yields statistical rules which are referred to as f and whose number P equals the number P of discretized mean intensity values QMk determined, or the number P of the bands of the histogram H.

Figure 5:
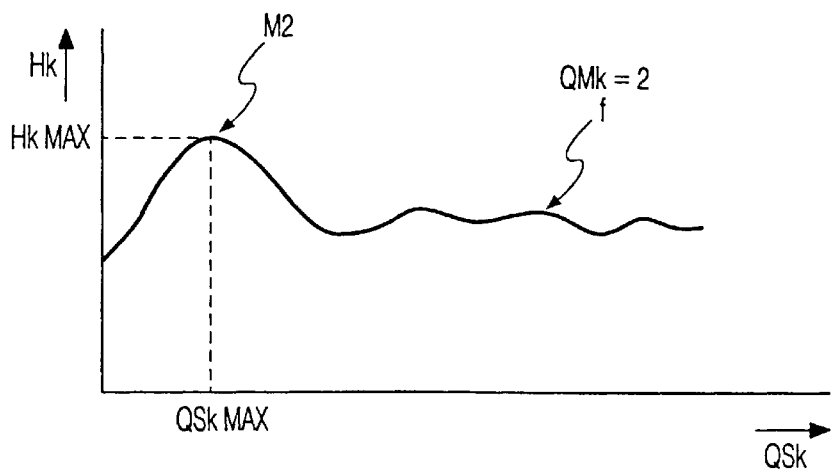
FIG. 5 illustrates the determination of the maximum HkMax of the P statistic curves Hk=f(QSk) there QMk=constant.

FIG. 5 shows, by way of example, such a statistical rule f for Hk=f(QSk) in the band 2 of the histogram H, where QMk=2, which band is bounded by the intensity levels 8 to 15 as shown in FIG. 4.

11) The processing (112) of the P statistical rules. Each of these statistical rules f has a principal maximum or first maximum which stems from the principle on which the invention is based, i.e. a maximum exists which is the result of the concomitant participation of the signal and the noise (relations (1) and (2)) as has already been described. This maximum is determined during an operation 112 and for this maximum, referred to as M1 to MP for each curve f from among the P curves, a maximum statistical parameter Hkmax is found in relation to a corresponding specific standard noise deviation QSkmax. If there are P statistical rules, therefore, there are P maxima M1 to MP of the curves f obtained during the step 112.

Figure 6:
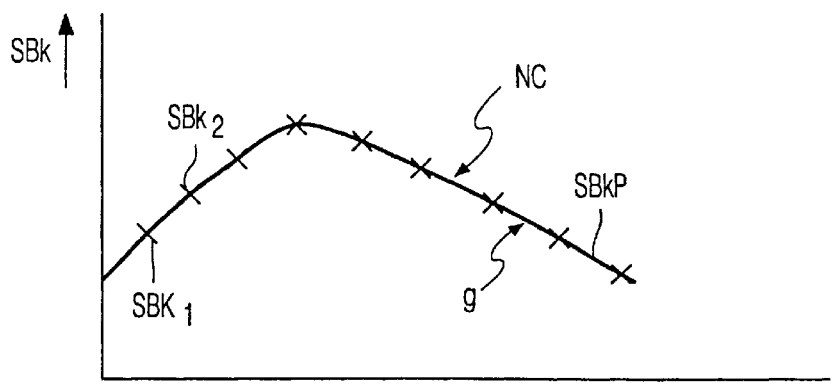
FIG. 6 shows a noise curve NC.

12) An operation (113) for searching, for all Hkmax, the associated P mean local intensity values QMk or for the P corresponding specific standard noise deviation values QSkmax, respectively. Referring to FIG. 6, P points which are characterized by the co-ordinate values QSkmax, QMk are thus determined.

13) An operation (114) for determining the non-quantified values which correspond to the co-ordinates QSkmax, QMk of said P points, respectively. On the basis of QSkmax, the non-quantified standard noise deviation, referred to as Skmax and corresponding to each maximum M1 to MP, is determined. This operation enables determination of the standard noise deviation SBk which corresponds to a slice of the mean value Mk. Actually, the standard noise deviation SBk is a linear relation of Skmax, in which the coefficients are dependent on the number of pixels contained in the neighborhood Vk in conformity with the expression:

$$SBk=[N/(N-1)]^{1/2}SkMax \qquad (7)$$

Moreover, the mean non-quantified intensity Mk is determined on the basis of the quantified mean value QMk, while utilizing an operation $QMk^{-1}$ which is known to those skilled in the art.

14) The determination (120) of a statistical rule NC, concerning the variation of the standard noise deviation as a function of the signal in the image, on the basis of the variations of said standard noise deviations SBk as a function g of the associated mean intensity values Mk corresponding to the P points thus analyzed, and formation of the so-called noise curve which is illustrated, by way of example, in FIG. 6 which shows SBk=g(Mk).

15) An operation (130) for reducing the noise of the image $J_0$, on the basis of the noise curve NC in order to supply a noise-reduced image J by any method which is known to those skilled in the art and requires knowledge of the noise curve.

The method can thus be applied to the reduction of the noise in an X-ray image. By automatic and systematic scanning of the X-ray image $J_0$, as acquired during the operation (100), the noise deduced from the curve NC is extracted from the intensity of each pixel. In the case where a sequence of images is acquired, the noise does not vary much and the extraction of the noise can be updated, for example every 10 images or also every second, thus enabling the formation of a sequence of noise-reduced images which can be examined in real time by means of a display device 7.

Figure 7:
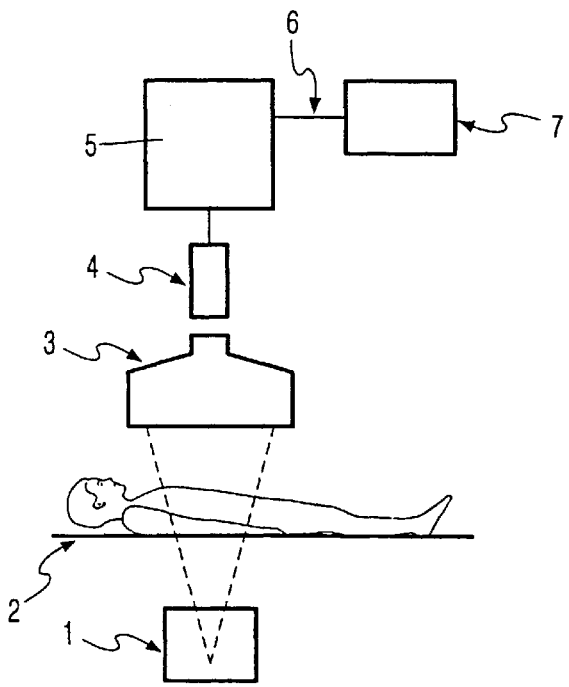
FIG. 7 shows a medical X-ray apparatus.

By way of example, FIG. 7 shows a medical imaging apparatus which includes a digital radiography system provided with means for carrying out the noise reduction method described above. This apparatus includes an X-ray source 1, a table 2 for accommodating the patient, a device for receiving the X-rays having traversed the patient, and notably an image intensifier device 3 which is coupled to a camera tube 4 which applies data to an image processing system 5 which includes a microprocessor.

The latter comprises several outputs, one output 6 of which is coupled to a monitor 7 for the visualization of images or sequences of images processed or to be processed.

The digitized radiographic image may contain 512×512 or 1024×1024 pixels encoded on 8 bits or 10 bits. Each pixel may thus be assigned an intensity level from among 256 or 1024 intensity levels. For example, the dark regions have a low intensity level and the bright regions of the image have a high intensity level.

The digitized image can be acquired in the fluoroscopy mode. The invention can be used in particular for the processing of arteriographic images.

The various steps and operations of the digital image processing method described above are carried out in the system 5. The data can be stored in a memory zone (not shown). Recording means (not shown) may also be used.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An image processing method for determining a noise curve (NC) relating to an image, comprising:
   acquisition of an image ($J_0$) which is formed by pixels having an intensity which includes a signal component and a noise component which is dependent on the signal component,
   cutting intensity levels of the image into bands (QMk) with substantially uniform intensity levels (Mk),
   determination of a plurality of statistical rules (f) which link distributions (Hk) of standard noise deviations to levels (QSk) of the standard noise deviation in said bands (QMk),
   determination, on the basis of the statistical rules (f), of a plurality of standard noise deviations (SBk) as a function of substantially uniform intensity levels (Mk) of the image, and
   determination of the noise curve (NC) as a statistical rule (g) of the variations of the standard noise deviations (SBk) as a function of said intensity levels (Mk) of the image.

2. A method as claimed in claim 1, further comprising definition of statistical parameters (Hk), wherein one of said statistical parameters represents a number of pixels having substantially the same level (QSk) of the standard noise deviation and having substantially the same intensity level as a band (QMk) of the image, and
   wherein said determination of said plurality of statistical distribution rules further comprises determining the statistical distribution rules as relations (f) which link the statistical parameters (Hk) to levels of the standard noise deviation (QSk) for each band (QMk), and
   wherein determination of said standard noise deviations further comprises determining, for each of said statistical rules, a maximum statistical parameter (Hmax) and corresponding specific standard noise deviation (Skmax), and determining, for each of said specific standard noise deviations (Skmax), of a standard noise deviation (SBk) corresponding to a substantially uniform intensity level (Mk) of a band (QMk), and
   wherein said determination of the noise curve (NC) further comprises determining the noise curve as a relation (g) linking the standard noise deviations (SBk) to said intensity levels (Mk) of the bands (QMk).

3. A method as claimed in claim 2, further comprising determining the standard noise deviation levels by:
   determination of pixels of interest (Pk) in the image, having an address (k∈),
   determination of a neighborhood (Vk) which contains a number of pixels which surround each pixel of interest (Pk) as well as said pixel of interest itself,
   scanning of the image on the basis of the pixels of interest with their neighborhoods (Vk),
   determination of a mean intensity value (Mk) in the neighborhood (Vk) of a pixel of interest (Pk),
   determination of the standard noise deviation (Sk) corresponding to said mean intensity value (Mk).

4. A method as claimed in claim 2, further comprising:
   discretization of mean local intensity values (QMk) and of the corresponding standard noise deviations to provide the levels of the standard noise deviations (QSk), and
   construction of a two-dimensional histogram whose points are the statistical parameters (Hk), which have as their co-ordinates the discretized local mean values (QMk) and the discretized standard noise deviations (QSk), and whose variable dimension in these co-ordinates is the number (Hk) of pixels having a given discrete local mean value and a corresponding discretized standard noise deviation.

5. A method as claimed in claim 4, wherein determination of statistical rules further comprises determining the statistical rules, on the basis of the two-dimensional histogram, as relations (f) between the values of statistical parameters (Hk) and discretized standard noise deviations (QSk) for each discrete local intensity value (QMk).

6. A method as claimed in claim 5, wherein the determination of standard noise deviations further comprises determination of non-discretized values (SBk), referred to as standard noise deviations, which correspond to the specific discretized standard noise deviations (QSkmax), and determination of non-discretized values of corresponding intensity levels (Mk).

7. A method as claimed in claim 3, in which the mean local intensity is given by calculation in conformity with the relation:

$$Mk = \frac{1}{N} \sum_{j \in Vk} Ij$$

and the associated standard noise deviation is given by a calculation in conformity with the relation:

$$Sk = \sqrt{\frac{1}{N} \sum_{j \in Vk} (Ck - Ij)^2}$$

wherein Ij is the intensity of the pixel at location j, Ck is the intensity of the pixel of interest, and N is the number of pixels in neighborhood Vk.

8. A method as claimed in claim 3, in which the mean local intensity and the associated standard noise deviation are given by calculations performed in conformity with the simplified relations:

Mk=Ck $$\text{and } Sk = \frac{1}{N} \sum_{j \in Vk} |(Ck - Ij)|, \text{ respectively}$$

wherein Ij is the intensity of the pixel at location j, Ck is the intensity of the pixel of interest, and N is the number of pixels in neighborhood Vk.

9. An image processing method for reducing the noise in an image comprising:
   performing a method as claimed in claim 1 in order to determine a noise curve in the image to be processed, or in a sequence of images to be processed, and
   reducing the noise in the image or in the sequence of images on the basis of the determined noise curve.

10. A medical imaging apparatus for providing a medical image of reduced noise comprising:
    means for generating a medical image including a signal component and a noise component, and
    means for image processing of the generated medical image by performing a method as claimed in claim 1 in order to provide the processed medical image with a reduced noise component.

11. The medical imaging apparatus of claim 10 wherein the means for generating the original medical image further comprises:

an x-ray source for irradiating a patient with x-rays, and a device for receiving x-rays that have traversed the patient, for generating an image, and for providing output signals representative of pixels of the generated image to the means for image processing.

12. The medical imaging apparatus of claim 10 wherein the means for image processing further comprises a microprocessor.